(12) United States Patent
Li et al.

(10) Patent No.: US 12,242,339 B2
(45) Date of Patent: Mar. 4, 2025

(54) MEMORY ERROR PROCESSING METHOD AND APPARATUS

(71) Applicant: XFUSION DIGITAL TECHNOLOGIES CO., LTD., Zhengzhou (CN)

(72) Inventors: Zhong Li, Hangzhou (CN); Jia Lou, Hangzhou (CN); Dongshu Zhou, Hangzhou (CN)

(73) Assignee: XFUSION DIGITAL TECHNOLOGIES CO., LTD, Zhengzhou (CN)

( * ) Notice: Subject to any disclaimer, the term of this patent is extended or adjusted under 35 U.S.C. 154(b) by 360 days.

(21) Appl. No.: 17/462,151

(22) Filed: Aug. 31, 2021

(65) Prior Publication Data

US 2021/0389956 A1  Dec. 16, 2021

Related U.S. Application Data

(63) Continuation of application No. PCT/CN2020/072925, filed on Jan. 19, 2020.

(30) Foreign Application Priority Data

Mar. 1, 2019 (CN) .......................... 201910157218.0

(51) Int. Cl.
*G06F 11/00* (2006.01)
*G06F 9/4401* (2018.01)
*G06F 11/07* (2006.01)
*G06F 11/10* (2006.01)
*G06F 11/20* (2006.01)

(52) U.S. Cl.
CPC ........ *G06F 11/1024* (2013.01); *G06F 9/4411* (2013.01); *G06F 11/0727* (2013.01); *G06F 11/0793* (2013.01); *G06F 11/2023* (2013.01); *G06F 9/4403* (2013.01)

(58) Field of Classification Search
None
See application file for complete search history.

(56) References Cited

U.S. PATENT DOCUMENTS

| 2014/0331015 A1* | 11/2014 | Prasad .................. G06F 3/0643 711/159 |
| 2015/0178142 A1* | 6/2015 | Raj ..................... G06F 11/0766 714/49 |

(Continued)

OTHER PUBLICATIONS

Google Patents/Scholar search—text refined (Year: 2023).*

(Continued)

*Primary Examiner* — Christopher S McCarthy

(57) ABSTRACT

In a memory error processing method, a processor of a computer apparatus obtains from a basic input/output system (BIOS) first error description information that describes a type of a first error that has occurred in a first memory page. Based on the first error description information, the processing device identifies the type of the first error to be a first type, wherein an error of the first type is a corrected error and is not a mirror scrub success error. The processor then determines that a number of errors of the first type that occurred in the first memory page has reached a threshold. In response to the determining, the processing device takes the first memory page offline.

15 Claims, 3 Drawing Sheets

(56) References Cited

U.S. PATENT DOCUMENTS

| | | | |
|---|---|---|---|
| 2017/0103780 A1* | 4/2017 | Nakata | G11B 20/1217 |
| 2019/0188092 A1* | 6/2019 | Prasad | G06F 11/1402 |
| 2022/0050603 A1* | 2/2022 | Zhou | G06F 3/0679 |
| 2023/0185659 A1* | 6/2023 | Bao | G06F 11/076 |
| | | | 714/764 |

OTHER PUBLICATIONS

Reliability, Availability, and Serviceability (RAS), intel, 2020 https://www.intel.com/content/www/us/en/developer/articles/technical/pmem-RAS.html#:~:text=Patrol%20scrub%20(also%20known%20as,the%20background%20during%20normal%20operation. (Year: 2020).*

Google Scholar/Patents search—text refined (Year: 2024).*

* cited by examiner

MEMORY ERROR PROCESSING METHOD AND APPARATUS

CROSS-REFERENCE TO RELATED APPLICATIONS

This application is a continuation of International Patent Application No. PCT/CN2020/072925, filed on Jan. 19, 2020, which claims priority to Chinese Patent Application No. 201910157218.0, filed on Mar. 1, 2019. The disclosures of the aforementioned applications are hereby incorporated by reference in their entirety.

TECHNICAL FIELD

This application relates to the field of computer technologies, and in particular, to a memory error processing method and apparatus.

BACKGROUND

For application layer software in a server, software producers such as SUSE and Red Hat provide technologies such as memory page offline, to ensure health of memory space used by the application layer software. The memory page offline is a technology used by an operating system (OS) layer to take a memory page offline. The memory page cannot be used by the application layer software after being taken offline.

Currently, the OS layer does not process a corrected error (CE), and only when an uncorrected error (UCE) occurs in a memory page, that the uncorrected error is specifically a software (SW) recoverable action optional (SRAO) error, an uncorrected no action (UCNA) error, or an SW recoverable action required (SRAR) error, the OS layer kills a process that is using the memory page (to be specific, closing an application that is using the memory page), thereby implementing offline of the memory page. However, the corrected error affects health of memory space, and consequently, reliability, availability, and serviceability (RAS) of the memory are affected.

SUMMARY

Embodiments of this application provide a memory error processing method and apparatus, to help improve RAS of memory.

To achieve the foregoing objective, the embodiments of this application provide the following technical solutions.

According to a first aspect, an embodiment of this application provides a memory error processing method, applied to a computer apparatus (such as a server), and the method includes: obtaining first error description information; determining, based on the first error description information, that an error that occurs in a first memory page is a non-mirror scrub success error of corrected errors; and in response to the determining, taking the first memory page offline when a quantity of times (an accumulated quantity of times) that the non-mirror scrub success error occurs in the first memory page reaches M (a preset quantity of times), where M is an integer greater than 1. This is a technical solution proposed by considering that the non-mirror scrub success error in the corrected error does not cause server breakdown but affects memory health to some extent. However, if such a memory error is immediately taken offline, unavailable fragmented memory is generated in a system, and system performance is affected. Therefore, compared with immediate offline, impact of memory page offline on system performance can be reduced by using threshold offline in this technical solution. In addition, compared with immediate offline, threshold offline can reduce impact of memory page offline on triggering of underlying hardware RAS characteristics (ADDDC/SDDC/rank sparing/SMI storm suppression). Therefore, compatibility between a hardware RAS technology and a software RAS technology can be improved.

In a possible design, after the first memory page is taken offline, the accumulated quantity of times that the error of a non-mirror scrub success error type in the corrected error occurs in the first memory page is cleared.

In a possible design, when the error that occurs in the first memory page is the non-mirror scrub success error in the corrected error, and when a current error occurs, the accumulated quantity of times that the non-mirror scrub success error occurs in the first memory page does not reach the preset quantity of times, the accumulated quantity of times that the non-mirror scrub success error occurs in the first memory page is increased by 1, and the first memory page is not taken offline.

In a possible design, the non-mirror scrub success error includes any one of: a corrected patrol error, a corrected read/write error, a corrected sparing error, or a mirror scrub failover error.

According to a second aspect, an embodiment of this application provides a memory error processing method, including: obtaining second error description information, where the second error description information is used to describe a type of an error that occurs in a second memory page; determining, based on the second error description information, that the error that occurs in the second memory page is a non-burst fatal error of uncorrected errors; and taking the second memory page offline in response to the determining. This is a technical solution proposed by considering that if a memory mirroring function is enabled and a memory page offline function is performed, available memory space is fragmented and reliability of a server memory system is greatly reduced. In this way, a coupling relationship between a software RAS technology and a hardware RAS technology can be reduced, thereby improving reliability of the overall memory system.

In a possible design, the non-burst fatal error includes any one of: a UCNA error, an SRAO error, an SRAR error, or an uncorrected patrol error.

In a possible design, when the non-burst fatal error is the SRAO error, the UCNA error, or the SRAR error, after the second memory page is taken offline, an application that uses the second memory page is not closed. This does not affect a user service.

According to a third aspect, an embodiment of this application provides a memory error processing apparatus, and the apparatus is configured to perform the method according to any one of the first aspect or the possible designs of the first aspect. The apparatus may be specifically a server or a chip.

In a possible design, the apparatus includes modules configured to perform the method according to any one of the first aspect or the possible designs of the first aspect.

In another possible design, the apparatus includes a memory and a processor. The memory is configured to store computer instructions, and when the apparatus runs, the processor executes the computer instructions in the memory, to perform, by using a hardware resource in the apparatus, operation steps of the method according to any one of the first aspect or the possible designs of the first aspect.

According to a fourth aspect, an embodiment of this application provides a memory error processing apparatus, and the apparatus is configured to perform the method according to any one of the second aspect or the possible designs of the second aspect. The apparatus may be specifically a server or a chip.

In a possible design, the apparatus includes modules configured to perform the method according to any one of the second aspect or the possible designs of the second aspect.

In another possible design, the apparatus includes a memory and a processor. The memory is configured to store computer instructions, and when the apparatus runs, the processor executes the computer instructions in the memory, to perform, by using a hardware resource in the apparatus, operation steps of the method according to any one of the second aspect or the possible designs of the second aspect.

An embodiment of this application further provides a computer readable storage medium, where the computer readable storage medium stores a computer program. When the computer program is run on a computer, the computer is enabled to perform operation steps of the method according to any one of the first aspect, the second aspect, or the possible designs of the first aspect and the second aspect.

An embodiment of this application further provides a computer program product. When the computer program product is run on a computer, operation steps of the method according to any one of the first aspect, the second aspect, or the possible designs of the first aspect and the second aspect are performed.

It may be understood that any one of the memory error processing apparatus, the computer readable storage medium, or the computer program product provided above is configured to perform a corresponding method provided above. Therefore, for a beneficial effect that can be achieved by the memory error processing apparatus, the computer readable storage medium, or the computer program product, refer to a beneficial effect in the corresponding method, and details are not described herein again.

DESCRIPTION OF EMBODIMENTS

Figure 1:
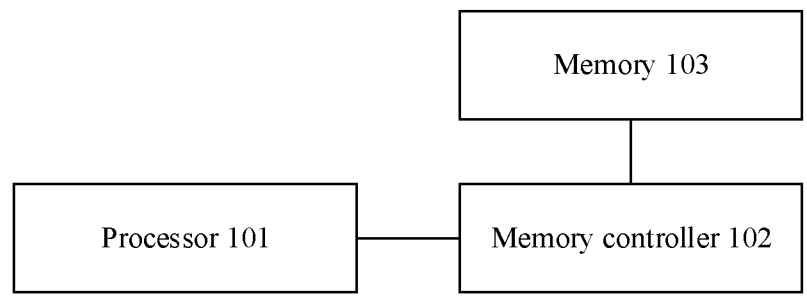
FIG. 1 is a schematic structural diagram of hardware of a server applicable to an embodiment of this application.

FIG. 1 is a schematic structural diagram of hardware of a server applicable to an embodiment of this application. The server may be any type of server that supports a memory page offline technology, for example, a server with an X86 architecture, and may be specifically a blade server, a high-density server, a rack server, a high-performance server, or the like. The server shown in FIG. 1 may include a processor 101, a memory controller 102, and a memory 103. The processor 101 and the memory controller 102 may be integrated together, or may be disposed independently. The processor 101 is a control center of the server, and may be specifically a central processing unit (CPU). The memory 103 is used for cache space. An operating system program, a software application program, and the like may be cached in the memory 103. The memory controller 102 is configured to manage data/programs in the memory 103.

The server shown in FIG. 1 is merely a schematic structural diagram of a server applicable to an embodiment of this application, and imposes no limitation on the server applicable to an embodiment of this application. For example, the server may further include a persistent storage medium, a communications interface, a communications line, and the like that are not shown in FIG. 1.

Figure 2:
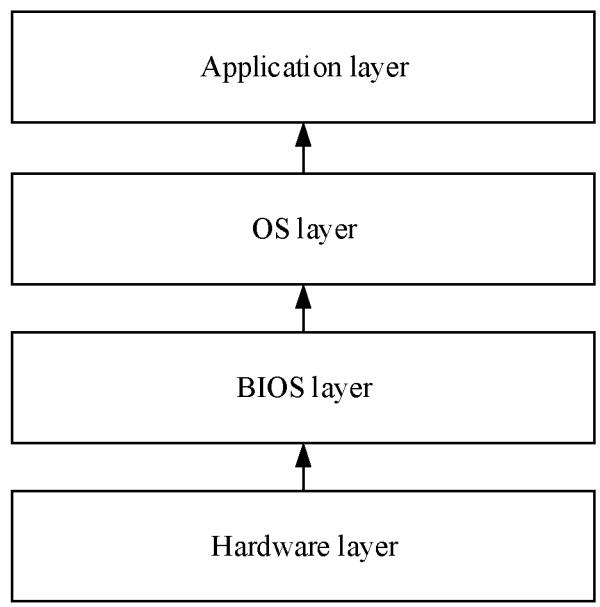
FIG. 2 is a schematic structural diagram of layers of a server applicable to an embodiment of this application.

The server includes a hardware layer and a software layer, and the software layer is a program code running on the hardware layer. The software layer may be further divided into several layers, and the layers communicate with each other through software interfaces. The software layer includes an application layer, an operating system (OS) layer, and a basic input/output system (basic input/output system, BIOS) layer from top to bottom, as shown in FIG. 2.

The hardware layer includes computer hardware such as a processor (for example, a CPU), a memory, and a memory controller, as shown in FIG. 1.

The BIOS layer is a most basic software code loaded on a computer hardware system.

The BIOS layer is a bottom-layer running program under the OS layer. As an abstract layer between the computer hardware and the OS layer, the BIOS layer is used for disposing hardware and preparing for running of the OS layer. The main functions of the BIOS layer are power application, self-check, CPU initialization, memory initialization, detection of an input/output device and a bootable device, and finally guiding the operating system to start. It should be noted that, that the BIOS layer performs a step (for example, the following step S101) in the following description may be understood as a case in which the processor 101 invokes the BIOS layer to perform the step.

The OS layer includes a program code of the operating system. The operating system can be Linux, Windows, vxWarks, or the like. A basic processing unit of the OS layer is a memory page. It should be noted that, that the OS layer performs a step (for example, the following step S104) in the following description may be understood as a case in which the processor 101 invokes the OS layer to perform the step.

The application layer includes a series of program codes for running an application program.

The following describes key technologies and terms in the embodiments of this application, to facilitate understanding of a reader.

(1). Memory RAS Technology

The memory RAS technology is a technology proposed to improve reliability, serviceability, and availability of the memory, and may include hardware RAS technologies and software RAS technologies. Details are as follows.

The hardware RAS technology may include technologies such as adaptive double device data correction (ADDDC), single device data correction (SDDC), memory mirroring, rank sparing, and system management interrupt (SMI) storm suppression. The hardware RAS technology may reduce a probability of server breakdown caused by uncorrected errors that are changed from accumulated corrected errors. The hardware RAS technology strongly depends on the hardware layer and BIOS layer.

The software RAS technology may include a memory page offline technology and the like. The software RAS technology depends on the OS layer. Specifically, after detecting a memory error, the BIOS layer reports the error to the OS layer by using SMI interrupt information. The OS layer may respond to the SMI interrupt information in real time without interrupting a user service (a service being executed at the application layer), and then a memory page in which the error occurs is taken offline. After the offline, the memory page that is taken offline cannot be used by the application layer. Therefore, it can be ensured that data of the application layer runs in healthy memory address space.

One RAS technology corresponds to one RAS function. For example, a memory mirroring technology corresponds to a memory mirroring function, and a memory offline technology corresponds to a memory offline function. Other examples are not listed one by one.

A server may support one or more hardware RAS technologies. When the server supports a plurality of hardware RAS technologies, the BIOS layer may simultaneously enable one hardware RAS technology or a plurality of hardware RAS technologies that are not mutually exclusive. If two hardware RAS technologies are mutually exclusive, when an RAS function corresponding to one RAS technology is enabled, an RAS function corresponding to the other RAS technology cannot be enabled. For example, an ADDDC function and the mirroring function are mutually exclusive.

When the ADDDC function, an SDDC function, the memory mirroring function, or a rank sparing function is enabled, the memory offline function can be in an enabled state. When an SMI storm suppression function is enabled, the memory offline function becomes invalid.

(2). Memory Mirroring Technology

Memory mirroring indicates that memory of a server is divided into two parts, where data in one part is a mirror of data in the other part, and is used to create a redundant copy of the memory. The memory mirroring technology is a technology in which redundant backup is performed on the memory address space. The memory mirroring includes partial mirroring, full mirroring, key address mirroring, and the like.

Reliability of the memory when the BIOS layer enables the memory mirroring function is much higher than that when the OS layer enables the memory page offline function. When the BIOS layer enables the memory mirroring function, if the OS layer enables the memory page offline function, available memory space is fragmented, and consequently, reliability of a server memory system is greatly reduced.

(3). SMI Storm Suppression Technology

The SMI storm suppression technology is a mechanism to prevent frequent reporting of interrupt information interfering with normal running of the system.

If a large quantity of corrected errors occur in the memory instantaneously, the BIOS layer generates and reports a large quantity of the SMI interrupt information to the OS layer. This affects normal running of the system. Therefore, a solution commonly used at present is as follows: when determining that a large quantity of corrected errors occur in the memory instantaneously, the BIOS layer triggers the SMI storm suppression function, and reports, to the OS layer, information indicating that "the SMI storm suppression function has been triggered". After receiving the information, the OS layer controls the memory page offline function to be invalid.

(4). Memory Error Classification

Memory errors may be classified into a corrected error and an uncorrected error. Further, the corrected error and the uncorrected error may be further subdivided into the following categories.

The corrected error may include the following errors.

1. A corrected patrol error occurs in an unused memory page and is a corrected memory error found by a patrol engine of a processor (such as a CPU).

2. A corrected read/write error (CE read/write error) occurs in a memory page that is being used in the system.

3. A corrected sparing error occurs after hardware device migration is triggered, for example, an error occurs after the BIOS layer enables the ADDDC function.

4. A mirror scrub failover error is an error that cannot be corrected by using a scrub mechanism after the BIOS layer enables the memory mirroring function, but mirror data can be used to ensure that the BIOS layer normally reports error information to the OS layer.

5. A mirror scrub success error is an error that is successfully corrected by using a scrub mechanism after the memory mirroring function is enabled, and the BIOS layer can successfully report error information of the error to the OS layer.

The uncorrected error may include the following errors.

6. A burst fatal error is an uncorrected error that causes system breakdown due to a hardware error of a memory module entity.

7. An SRAO error is an uncorrected error that is chosen to be processed.

8. A UCNA error is an uncorrected error that does not need to be processed.

9. An SRAR error is an uncorrected error that needs to be processed.

10. An uncorrected patrol error occurs in an unused memory page and is an uncorrected memory error found by a patrol engine of a processor (such as a CPU).

In an example, error codes of the foregoing errors 1 to 10 are as follows.

1. An error code of the corrected patrol error is Error_Type: CE; MSCODE: 0x0008.

2. An error code of the corrected read/write error is Error_Type: CE; MSCODE: 0x0101.

3. An error code of the corrected sparing error is Error_Type: CE; MSCODE: 0x0020.

4. An error code of the mirror scrub failover error is Error_Type: CE; MSCODE: 0x0101; Mci_Misc: Bit(63).

5. An error code of the mirror scrub success error is Error_Type: CE; MSCODE: 0x0101; Mci_Misc: Bit(62).

6. An error code of the burst fatal error is Error_Type: UCE.

7. An error code of the SRAO error is Error_Type: UCE; MSCODE: 0x0010.

8. An error code of the UCNA error is Error_Type: UCE; MSCODE: 0x0101.

9. An error code of the SRAR error is Error_Type: UCE; MSCODE: 0x0010.

10. An error code of the uncorrected patrol error is Error_Type: CE; MSCODE: 0x0010.

It should be noted that, in some embodiments, the CPU supports a UCE degradation function. The "SRAO error" described in this embodiment of this application indicates an uncorrected patrol error when the UCE degradation function is disabled. The "uncorrected patrol error" described in this embodiment of this application indicates an uncorrected patrol error when the UCE degradation function is enabled. Alternatively, in an implementation, "the error code of the SRAO error being Error_Type: UCE; MSCODE: 0x0010" may be understood as "the error code of the SRAO error when the UCE degradation function is disabled", and "the error code of the uncorrected patrol error being Error_Type:

CE; MSCODE: 0x0010" is understood as "the error code of the SRAO error code when the UCE degradation function is enabled".

In addition, for "the error code of the uncorrected patrol error being Error_Type: CE; MSCODE: 0x0010", when the OS layer determines that the Error_Type of the error code is CE, and it is determined that the MSCODE is 0x0010, a current error is considered as the uncorrected patrol error (the uncorrected patrol error when the UCE degradation function is enabled).

(5). Threshold Offline and Immediate Offline

When the memory page offline technology is used, concepts of "threshold offline" and "immediate offline" are proposed in some embodiments of this application, to distinguish between memory page offline performed under different use conditions. Details are as follows.

The threshold offline indicates that if an accumulated quantity of times that errors of a same type occur in a current memory page reaches a preset quantity of times, the current memory page is taken offline. The preset quantity of times is an integer greater than 1.

Immediate offline indicates that if a type of error occurs in a current memory page once, the current memory page is taken offline.

(6). Compatibility Between the Hardware RAS Technology and the Software RAS Technology When a server supports two technologies, if one of the two technologies is enabled but the other technology is not affected or slightly affected, it is considered that compatibility between the two technologies is good.

The hardware RAS technology and the software RAS technology are widely used as means for reliability of server memory. However, when being used at the same time, the two technologies affect each other. For example, after the OS layer performs memory page offline, no read/write operation is performed on the memory page that is taken offline. This causes a decrease in corrected errors, and therefore, a probability that an underlying hardware RAS characteristic is triggered decreases synchronously. For another example, when the memory mirroring function is enabled and memory page offline occurs again, reliability of the overall memory decreases.

(7). Other Terms

In this application, "at least one" includes one or more. "A plurality of" means two or more than two. For example, at least one of A, B, or C includes the following cases: only A exists, only B exists, both A and B exist, both A and C exist, both B and C exist, and A, B, and C all exist. In this application, "/" means "or". For example, A/B may represent A or B. In this specification, "and/or" describes only an association relationship for describing associated objects and represents that three relationships may exist. For example, A and/or B may represent the following three cases:

Only A exists, both A and B exist, and only B exists.

The following describes a memory error processing method according to an embodiment of this application with reference to the accompanying drawings.

Figure 3:
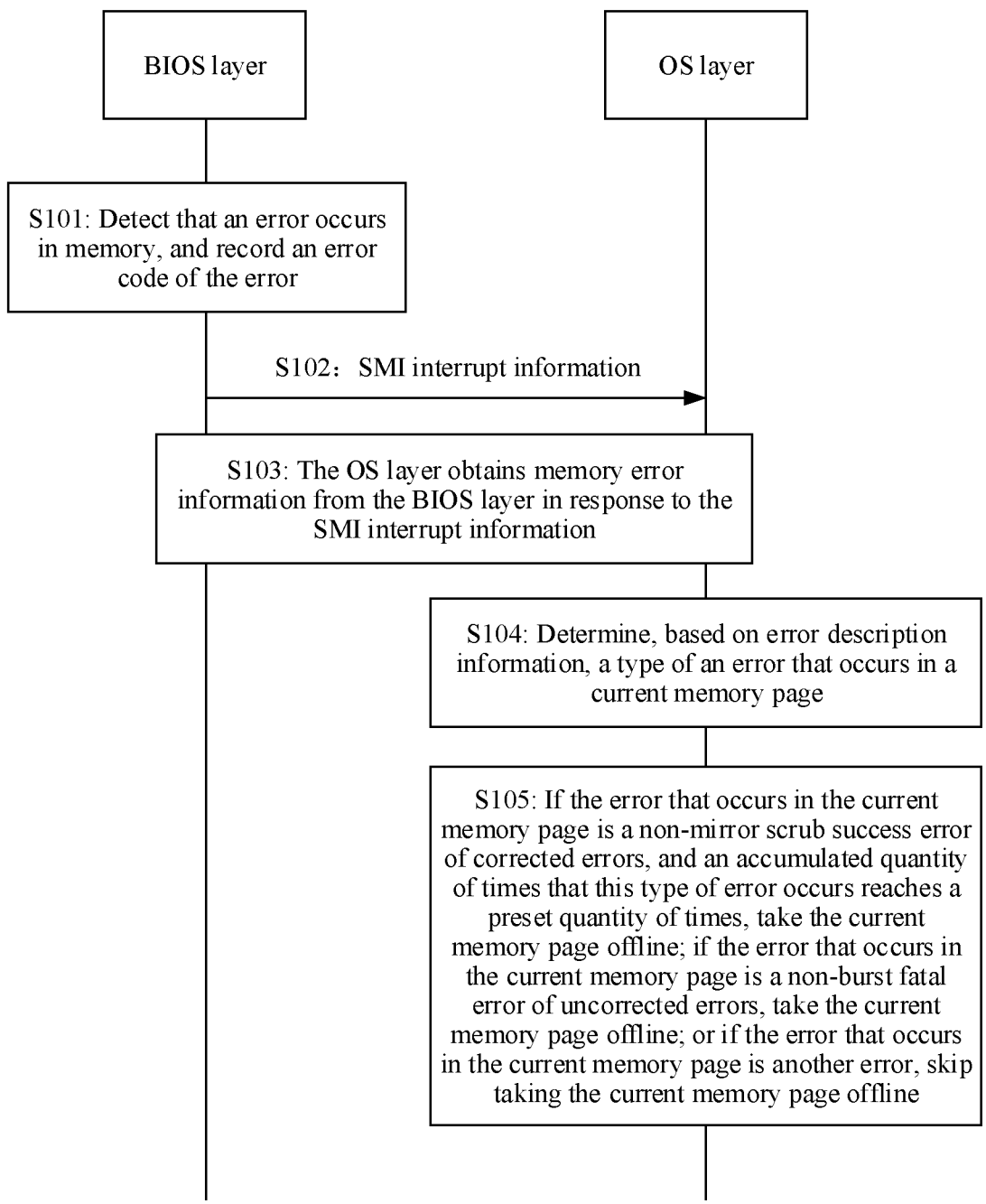
FIG. 3 is a flowchart of a memory error processing method according to an embodiment of this application.

FIG. 3 is a flowchart of a memory error processing method according to an embodiment of this application. The method shown in FIG. 3 includes the following steps.

S101: A BIOS layer detects that an error occurs in memory, and records an error code of the error. For a specific implementation of this step, refer to the prior art, and details are not described herein.

S102: The BIOS layer sends SMI interrupt information to an OS layer.

S103: The OS layer obtains memory error information from the BIOS layer in response to the SMI interrupt information.

The memory error information includes an identifier of a memory page (referred to as "current memory page" below) in which the error occurs and error description information, and the error description information is used to describe a type of the error that occurs in the current memory page. The identifier of the current memory page may be an address of the current memory page.

The error description information may be the error code of the error that occurs in the current memory page, or identification information such as a type number of the type that is of the error and that is obtained after the BIOS layer analyzes the error code of the error that occurs in the current memory page. In some embodiments, a type number of each error may be predefined between the BIOS layer and the OS layer.

The type of the error that occurs in the current memory page is not limited in this embodiment of this application. Several implementations are listed below.

Manner 1: The type of the error that occurs in the current memory page may be any one of the foregoing errors 1 to 10. For details, refer to the following Table 1.

Manner 2: The type of the error that occurs in the current memory page may be any one of the foregoing errors 1 to 6 and a non-fatal error. For details, refer to the following Table 2.

Manner 3: The type of the error that occurs in the current memory page may be any one of: a non-mirror scrub success error of corrected errors, a non-burst fatal error of uncorrected errors, and another error. For details, refer to the following Table 3.

It may be understood that, in the technical solution provided in the background, a type of an error that occurs in a current memory page may be any one of: a corrected error, a burst fatal error of uncorrected errors, and a non-burst fatal error of uncorrected errors. In this embodiment of this application, the type of the error that occurs in the current page is different from that in the technical solution provided in the background. In some implementations, the type of the error that occurs in the memory page is classified at a finer granularity in this embodiment of this application.

It may be understood that S102 and S103 are described by using an example in which the BIOS layer reports the memory error information to the OS layer by using SMI interrupt information This embodiment of this application is not limited thereto. In other words, the OS layer may alternatively obtain the memory error information in another manner.

S104: The OS layer determines, based on the error description information, the type of the error that occurs in the current memory page.

It is assumed that the error description information obtained by the OS layer is the error code, and in the error code, "Error_Type" is referred to as a first error code, "MSCODE" is referred to as a second error code, and "Mci_Misc" is referred to as a third error code.

Based on Manner 1, S103 may include the following cases.

If the first error code is CE, the OS layer learns, based on content of the second error code, that the error is the error 1, the error 2, the error 3, a mirror scrub error, or the error 10. Further, if it is learned, based on the content of the second error code, that the error is the mirror scrub error, the OS layer learns, based on content of the third error code, whether the error is the error 4 or the error 5.

If the first error code is UCE, when the error description information does not include the second error code, the OS layer determines that the error is a burst fatal error, or when the error description information includes the second error code, the OS layer determines that the error is a non-burst fatal error, and further determines, based on content of the second error code, a non-burst fatal error to which the error belongs.

A difference between a specific implementation of S103 based on Manner 2 and the specific implementation of S103 based on Manner 1 lies in that if the first error code is UCE, the OS layer does not need to determine, based on content of the second error code, a non-burst fatal error to which the error belongs.

A difference between a specific implementation of S103 based on Manner 3 and the specific implementation of S103 based on Manner 2 lies in that if the first error code is CE, the OS layer may determine, based on content of the second error code, whether the error is a mirror scrub error. Further, when the error is not the mirror scrub error, it is determined that the type of the error is a type 1. When the error is the mirror scrub error, it is learned, based on content of the third error code, whether the error is the error 4 or the error 5, so as to determine whether the type of the error is a type 1 or a type 3.

The specific implementations of S103 that are listed above are merely examples, and the specific implementations of S103 provided in this embodiment of this application are not limited. For example, based on Manner 3, the BIOS layer and the OS layer may predefine that the type of the error is represented by using a two-bit binary number. For example, a binary number "00" is used to indicate the type 1, "01" is used to indicate a type 2, and "10" is used to indicate the type 3. Based on this, the error description information may include a binary number that indicates the type of the error, and the OS layer may determine, based on a value of the binary number, the type of the error that occurs in the current memory page. In another manner, the type of the error may also be represented based on a binary number, and details are not described herein again.

S105: The OS layer processes the current memory page based on the type of the error that occurs in the current memory page.

The following describes a specific implementation of S105 by using specific examples.

Example 1: Based on Manner 1, a correspondence between a type of an error that occurs in a memory page and a processing manner of the memory page may be shown in Table 1.

TABLE 1

| Error type | Processing manner | |
|---|---|---|
| Corrected errors | Type 1: Corrected patrol error 1 | Threshold offline |
| | Type 2: Corrected read/write error 2 | |
| | Type 3: Corrected sparing error 3 | |
| | Type 4: Mirror scrub failover error 4 | |
| | Type 5: Mirror scrub success error 5 | No offline |
| Uncorrected errors | Type 6: Burst fatal error 6 | |
| | Type 7: SRAO error 7 | Immediate offline |
| | Type 8: UCNA error 8 | |
| | Type 9: SRAR error 9 | |
| | Type 10: Uncorrected patrol error 10 | |

Based on Table 1, if the type of the error that occurs in the current memory page is a type i, and an accumulated quantity of times that an error of the type i occurs reaches a preset quantity of times, the OS layer takes the current memory page offline, where i=1, 2, 3, or 4. When different values are set for i, corresponding preset quantities of times may be the same or different. If the type of the error that occurs in the current memory page is the type 5 or the type 6, the OS layer dose not take the current memory page offline. If the type of the error that occurs in the current memory page is any one of types 7 to 10, the OS layer takes the current memory page offline. In other words, the OS layer needs to identify a specific error in errors 1 to 10.

Example 2: Based on Manner 2, a correspondence between a type of an error that occurs in a memory page and a processing manner of the memory page may be shown in Table 2.

TABLE 2

| Error type | | Processing manner |
|---|---|---|
| Corrected errors | Type 1: Corrected patrol error 1 | Threshold offline |
| | Type 2: Corrected read/write error 2 | |
| | Type 3: Corrected sparing error 3 | |
| | Type 4: Mirror scrub failover error 4 | |
| | Type 5: Mirror scrub success error 5 | No offline |
| Uncorrected errors | Type 6: Burst fatal error 6 | |
| | Type 7: Non-burst fatal errors (including an SRAO error 7, a UCNA error 8, an SRAR error 9, and an uncorrected patrol error 10) | Immediate offline |

Based on Table 2, if the type of the error that occurs in the current memory page is a type i, and an accumulated quantity of times that an error of the type i occurs reaches a preset quantity of times, the OS layer takes the current memory page offline, where i=1, 2, 3 or 4. When different values are set for i, corresponding preset quantities of times may be the same or different. If the type of the error that occurs in the current memory page is the type 5 or the type 6, the OS layer dose not take the current memory page offline. If the type of the error that occurs in the current memory page is the type 7, the OS layer takes the current memory page offline. In other words, the OS layer only needs to identify a specific type, in types 1 to 7 shown in Table 2, to which the error that occurs in the current memory page belongs. For the type 7, there is no need to identify a specific error in errors 7 to 10.

Example 3: Based on Manner 3, a correspondence between a type of an error that occurs in a memory page and a processing manner of the memory page may be shown in Table 3.

TABLE 3

| Error type | Processing manner |
|---|---|
| Type 1: Non-mirror scrub success errors of corrected errors (including a corrected patrol error 1, a corrected read/write error 2, a corrected sparing error 3, and a mirror scrub failover error 4) | Threshold offline |
| Type 2: Non-burst fatal errors of uncorrected errors (including an SRAO error 7, a UCNA error 8, an SRAR error 9, and an uncorrected patrol error 10) | Immediate offline |
| Type 3: Other errors (including a mirror scrub success error 5 and a burst fatal error 6) | No offline |

Based on Table 3, S105 may include: If the error that occurs in the current memory page is the non-mirror scrub success error in the corrected error, and an accumulated quantity of times that this type of error occurs reaches a preset quantity of times, the OS layer takes the current memory page offline. If the error that occurs in the current memory page is the non-burst fatal error in the uncorrected error, the OS layer takes the current memory page offline. If the error that occurs in the current memory page is another error, the OS layer does not take the current memory page offline. FIG. 3 is described by using the foregoing description as an example. In other words, the OS layer only needs to identify a specific type, in types 1 to 3 shown in Table 3, to which the error that occurs in the current memory page belongs, and there is no need to identify a specific error in errors 1 to 10.

Based on Example 3, S105 may be described as follows: The OS layer processes different types of errors in different processing manners.

Based on any one of the examples provided above, for the SRAO error 7, the UCNA error 8, and the SRAR error 9, in the prior art, memory page offline is implemented by closing an application that uses a current memory page. This affects a user service to some extent. Optionally, in the technical solution provided in this embodiment of this application, the OS layer may directly take the current memory page offline without closing an application that uses the current memory page. In this way, the user service is not affected.

Based on any one of the examples provided above, if the type of the error that occurs in the current memory page is an error type corresponding to the threshold offline manner, and optionally, if the accumulated quantity of times that this type of error occurs in the current memory page reaches the preset quantity of times, the OS layer takes the current memory page offline, and clears the accumulated number of times that this type of error occurs in the current memory page. If the accumulated quantity of times that this type of error occurs in the current memory page does not reach the preset quantity of times, the OS layer takes the current memory page offline, and increases, by 1, the accumulated quantity of times that this type of error occurs in the current memory page. A counter that is configured to record a quantity of times that this type of error occurs in the current memory page may be provided in the server, and the counter may be implemented by using software and/or hardware.

In this embodiment of this application, when the non-mirror scrub success error (such as the corrected patrol error, the corrected read/write error, the corrected sparing error, or the mirror scrub failover error) in the corrected error occurs in memory, the threshold offline manner is used. This is a technical solution proposed by considering that the non-mirror scrub success error in the corrected error does not cause server breakdown but affects memory health to some extent. In addition, immediate offline causes unavailable fragmented memory to be generated in the system, and consequently, system performance is affected. Therefore, compared with immediate offline, threshold offline can reduce impact of memory page offline on system performance. In addition, compared with immediate offline, threshold offline can reduce impact of memory page offline on triggering of underlying hardware RAS characteristics (ADDDC/SDDC/rank sparing/SMI storm suppression). Therefore, compatibility between a hardware RAS technology and a software RAS technology can be improved.

A specific value of the preset quantity of times and a factor based on which the value of the preset quantity of times is determined are not limited in this embodiment of this application. For example, the value of the preset quantity of times may be determined by comprehensively considering factors such as impact of memory page offline on system performance and impact of a currently occurring memory error on memory health. For different types of non-mirror scrub success errors (such as the corrected patrol error, the corrected read/write error, the corrected sparing error, or the mirror scrub failover error) in the corrected error, the preset quantity of times may be equal or unequal.

In this embodiment of this application, when the mirror scrub success error occurs in the memory, a manner in which no offline is performed is used. This is a technical solution proposed by considering that if a memory mirroring function is enabled and a memory page offline function is performed, available memory space is fragmented and reliability of a server memory system is greatly reduced. In this way, a coupling relationship between a software RAS technology and a hardware RAS technology can be reduced, thereby improving reliability of the overall memory system.

In this embodiment of this application, when the uncorrected patrol error occurs in the memory, an immediate offline manner is used. This is a technical solution proposed by considering that the uncorrected patrol error is an uncorrected error that does not cause breakdown and memory breakdown is almost caused in the server when the error occurs. This can prevent ill-condition memory causing server breakdown.

It should be noted that, for the mirror scrub failover error, because memory address space mirroring provides redundant backup space for reading and writing memory data, reliability of mirror scrubbing is higher than that of memory page offline. However, when an error is detected in data backup space and the error is scrubbed, if the scrubbing fails, a new mirror scrub failover error is evolved. If this error occurs, a working area of memory space is unbound from a backup area, and the backup area is restored to available memory. In this case, the backup area is the same as common memory (to be specific, memory when a memory mirroring function is in a disabled state). Therefore, threshold offline is applied.

The solutions provided in the embodiments of this application are described above from a perspective of the methods. To implement the foregoing functions, an apparatus includes a corresponding hardware structure and/or software module for performing each function. A person skilled in the art should easily be aware that, in combination with units and algorithm steps of the examples described in the embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, a memory error processing apparatus may be divided into function modules based on the foregoing method examples. For example, each function module may be obtained through division based on each corresponding function, or two or more functions may be integrated into one processing module. The integrated module may be implemented in a form of hardware, or may be implemented in a form of a software functional module. It should be noted that, in the embodiments of this application, module division is an example, and is merely logical function division. In actual implementation, another division manner may be used.

Figure 4:
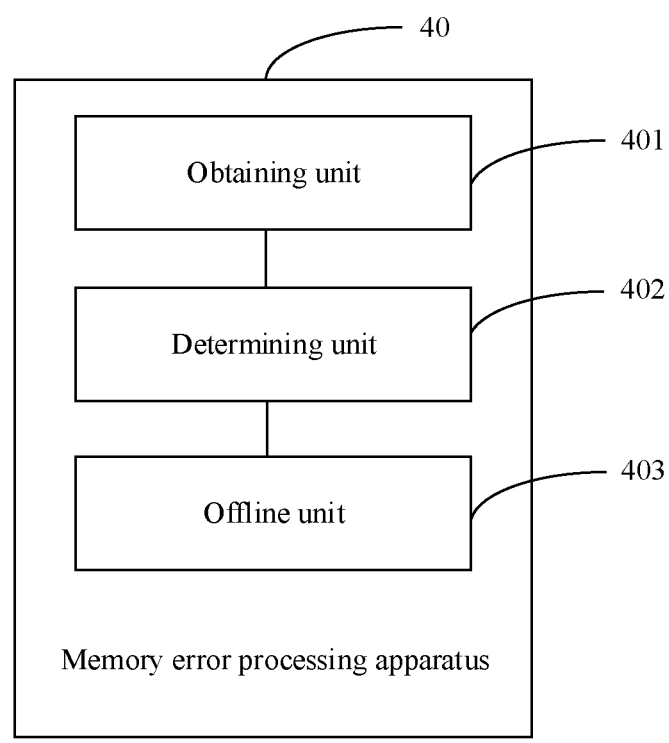
FIG. 4 is a schematic structural diagram of a memory error processing apparatus according to an embodiment of this application.

FIG. 4 is a schematic structural diagram of a memory error processing apparatus 40 according to an embodiment of this application. In an example, the memory error processing apparatus 40 may be a server. The memory error processing apparatus 40 may be configured to perform the memory error processing method shown in FIG. 3. The memory error processing apparatus 40 may include an obtaining unit 401, a determining unit 402, and an offline unit 403. In an example, with reference to the server shown in FIG. 1, the obtaining unit 401, the determining unit 402, and the offline unit 403 may all be implemented by using the processor 101 in FIG. 1. In another example, with reference to the server shown in FIG. 2, the obtaining unit 401, the determining unit 402, and the offline unit 403 may all be implemented by using the OS layer in FIG. 2.

In some embodiments, the obtaining unit 401 is configured to obtain first error description information. The first error description information is used to describe a type of an error that occurs in a first memory page. The determining unit 402 is configured to determine, based on the first error description information, that the error that occurs in the first memory page is a non-mirror scrub success error of corrected errors. The offline unit 403 is configured to: in response to the determining, take the first memory page offline when a quantity of times that the non-mirror scrub success error occurs in the first memory page reaches M, where M is an integer greater than 1. For example, with reference to FIG. 3, the obtaining unit 401 may be configured to perform the step of S103 in which the OS layer obtains memory error information. The determining unit 402 may be configured to perform S104. The offline unit 403 may be configured to perform the step of S105 of "taking the current memory page offline if the error that occurs in the current memory page is the non-mirror scrub success error in the corrected error and the accumulated quantity of times that this type of error occurs reaches M".

Optionally, the non-mirror scrub success error includes any one of: a corrected patrol error, a corrected read/write error, a corrected sparing error, or a mirror scrub failover error.

In some embodiments, the obtaining unit 401 is configured to obtain second error description information. The second error description information is used to describe a type of an error that occurs in a second memory page. The determining unit 402 is further configured to determine, based on the second error description information, that the error that occurs in the second memory page is a non-burst fatal error of uncorrected errors. The offline unit 403 is configured to: if it is determined, based on the second error description information, that the error that occurs in the second memory page is an uncorrected error, take the second memory page offline when the error that occurs in the second memory page is the non-burst fatal error. For example, with reference to FIG. 3, the obtaining unit 401 may be configured to perform the step of S103 in which the OS layer obtains memory error information. The determining unit 402 may be configured to perform S104. The offline unit 403 may be configured to perform the step of S105 of "taking the current memory page offline if the error that occurs in the current memory page is the non-burst fatal error in the uncorrected error".

Optionally, the non-burst fatal error includes any one of: a UCNA error, an SRAO error, an SRAR error, or an uncorrected patrol error.

Optionally, when the non-burst fatal error is the SRAO error, the UCNA error, or the SRAR error, after the second memory page is taken offline, an application that uses the second memory page is not closed.

In some embodiments, if the error that occurs in the current memory page is another error (an error other than the non-mirror scrub success error in the corrected error and the non-burst fatal error in the uncorrected error), the current memory page is not taken offline.

For explanation of related content in any memory error processing apparatus 40 provided above and description of beneficial effects, refer to the foregoing corresponding method embodiments, and details are not described herein again.

All or a part of the foregoing embodiments may be implemented by software, hardware, firmware, or any combination thereof. When a software program is used to implement the embodiments, the embodiments may be implemented completely or partially in a form of a computer program product. The computer program product includes one or more computer instructions. When the computer instructions are loaded and executed on a computer, the procedure or functions according to the embodiments of this application are completely or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (solid state disk, SSD)), or the like.

Although this application is described with reference to the embodiments, in a process of implementing this application that claims protection, a person skilled in the art may understand and implement another variation of the disclosed embodiments by viewing the accompanying drawings, disclosed content, and the appended claims. In the claims, "comprising" (comprising) does not exclude another component or another step, and "a" or "one" does not exclude a meaning of plurality. A single processor or another unit may implement several functions enumerated in the claims. Some measures are recorded in dependent claims that are different from each other, but this does not mean that these measures cannot be combined to produce a better effect.

Although this application is described with reference to specific features and the embodiments thereof, it is clear that various modifications and combinations may be made to them without departing from the spirit and scope of this application. Correspondingly, the specification and accompanying drawings are merely example description of this application defined by the appended claims, and is considered as any of or all modifications, variations, combinations or equivalents that cover the scope of this application. It is clear that a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A memory error processing method performed by a computer apparatus, comprising:
obtaining first error description information from a basic input/output system (BIOS), wherein the first error description information describes a type of a first error that has occurred in a first memory page;
identifying, based on the first error description information, that the type of the first error is a first type, wherein an error of the first type is a correctable patrol error, a correctable read/write error, a correctable sparing error, or a mirror scrub failover error that is correctable;
determining that a number of errors of the first type that occurred in the first memory page has reached a threshold; and
in response to the determining that the number of errors of the first type that occurred in the first memory page has reached the threshold, taking the first memory page offline,
wherein, when an error occurred in the first memory page is a mirror scrub success error, the first memory page is not taken offline, the mirror scrub success error being a correctable error,
wherein, after the first memory page is taken offline, an accumulated quantity of times that a correctable error of a non-mirror scrub success error type occurs in the first memory page is cleared.

2. The method according to claim 1, further comprising:
obtaining second error description information from the BIOS, wherein the second error description information describes a type of a second error that has occurred in a second memory page;
identifying, based on the second error description information, that the type of the second error is a second type, wherein an error of the second type is an uncorrectable error and is not a burst fatal error; and
taking the second memory page offline in response to identifying that the type of the second error is the second type.

3. The method according to claim 2, wherein the second error is an uncorrectable no action (UCNA) error, a software recoverable action optional (SRAO) error, or a software recoverable action required (SRAR) error.

4. The method according to claim 3, wherein the second memory page is used by an application, and taking the second memory page offline comprises taking the second memory page offline without closing the application.

5. The method according to claim 2, wherein the second error is an uncorrectable patrol error.

6. The method according to claim 2, wherein, when the error occurred in the first memory page is an uncorrectable error that is of a type other than the second type, the first memory page is not taken offline.

7. The method according to claim 1, wherein, when the error occurred in the first memory page is a burst fatal error, the first memory page is not taken offline.

8. The method according to claim 1, wherein, when the number of errors of the first type that occurred in the first memory page has not reached the threshold, the first memory page is not taken offline.

9. A computer apparatus, comprising:
at least one processor,
a basic input/output system (BIOS), and
a memory comprising a first memory page, wherein the memory is configured to store computer-executable instructions that, when executed by the at least one processor, cause the computer apparatus to:
obtain first error description information from the BIOS, wherein the first error description information describes a type of a first error that has occurred in the first memory page;
based on the first error description information, identify that the type of the first error is a first type, wherein an error of the first type is a correctable patrol error, a correctable read/write error, a correctable sparing error, or a mirror scrub failover error that is correctable;
determine that a number of errors of the first type that occurred in the first memory page has reached a threshold; and
in response to determining that the number of errors of the first type has reached the threshold, take the first memory page offline,
wherein, when an error occurred in the first memory page is a mirror scrub success error, the first memory page is not taken offline, the mirror scrub success error being a correctable error,
wherein, after the first memory page is taken offline, an accumulated quantity of times that a correctable error of a non-mirror scrub success error type occurs in the first memory page is cleared.

10. The apparatus according to claim 9, wherein the computer-executable instructions, when executed by the at least one processor, further cause the computer apparatus to:
obtain second error description information from the BIOS, wherein the second error description information describes a type of a second error that has occurred in a second memory page;
based on the second error description information, identify that the type of the second error is a second type, wherein an error of the second type is an uncorrectable error and is not a burst fatal error; and
take the second memory page offline in response to identifying that the type of the second error is the second type.

11. The apparatus according to claim 10, wherein the second error is an uncorrectable no action (UCNA) error, a software recoverable action optional (SRAO) error, or a software recoverable action required (SRAR) error.

12. The apparatus according to claim 11, wherein the second memory page is used by an application, and taking the second memory page offline comprises taking the second memory page offline without closing the application.

13. The apparatus according to claim 10, wherein the second error is an uncorrectable patrol error.

14. The apparatus according to claim 10, wherein, when the error occurred in the first memory page is an uncorrectable error that is of a type other than the second type, the first memory page is not taken offline.

15. The apparatus according to claim 9, wherein, when the error occurred in the first memory page is a burst fatal error, the first memory page is not taken offline.

* * * * *